United States Patent [19]

Krieger

[11] Patent Number: 4,718,375

[45] Date of Patent: Jan. 12, 1988

[54] DRYING APPARATUS FOR HORSES AND THE LIKE

[76] Inventor: Max Krieger, Scherpenseeler Str. 39, D-5180 Eschweiler, Fed. Rep. of Germany

[21] Appl. No.: 870,081

[22] Filed: Jun. 3, 1986

[51] Int. Cl.⁴ .............................................. A01K 29/00
[52] U.S. Cl. ........................................ 119/160; 119/1; 54/79
[58] Field of Search ................. 119/158, 159, 160, 19, 119/1; 15/482; 54/79

[56] References Cited

U.S. PATENT DOCUMENTS

| | | | |
|---|---|---|---|
| 754,294 | 3/1904 | Foglesong | 54/79 X |
| 2,791,168 | 5/1957 | Mauch | 5/482 X |
| 3,108,568 | 10/1963 | Whitney et al. | 119/160 X |
| 3,150,641 | 9/1964 | Kesh | 119/160 |
| 3,596,636 | 8/1971 | Stobaugh | 119/160 X |
| 3,749,064 | 7/1973 | Weinstein et al. | 119/158 |
| 4,144,845 | 3/1979 | Sneider | 119/160 |

*Primary Examiner*—Henry E. Raduazo
*Assistant Examiner*—Richard E. Chilcot, Jr.
*Attorney, Agent, or Firm*—K. S. Cornaby

[57] ABSTRACT

A drying apparatus for horses and the like comprises and inflatable jacket made of an inner cut and an outer cut, both cuts having identical shape and are made from an airtight flexible foil. They are bonded along their margins except at least one supply region and are further bonded at different sets of connecting stripes, whereby tubelike air ducts are formed between adjacent connecting stripes. The inner cut has a plurality of discharge holes, vent-holes are provided in the area of the connecting stripes. Closure means are provided at the outer cut for closing and opening said jacket.

The jacket when inflated assumes the shape of a tubelike body having at least two opening, the air streaming through the discharge holes into the inner side of the jacket escapes through the vent-holes to the outside of the jacket.

8 Claims, 7 Drawing Figures

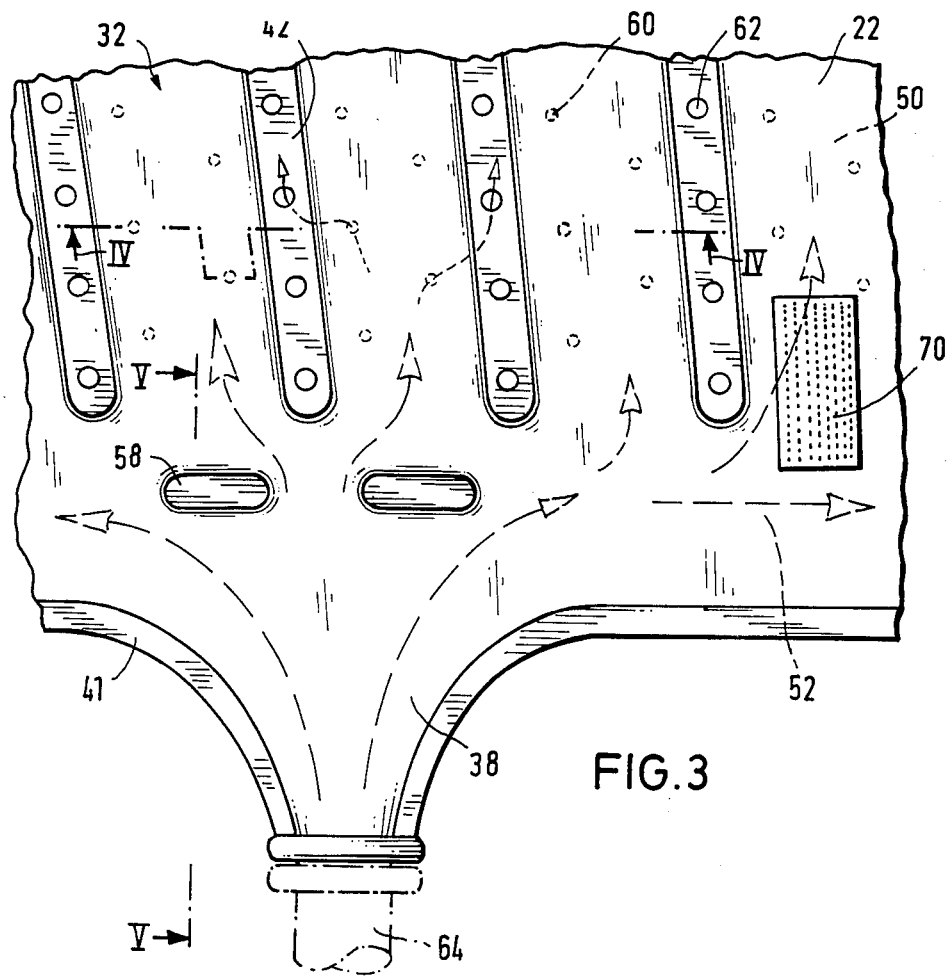
FIG. 3
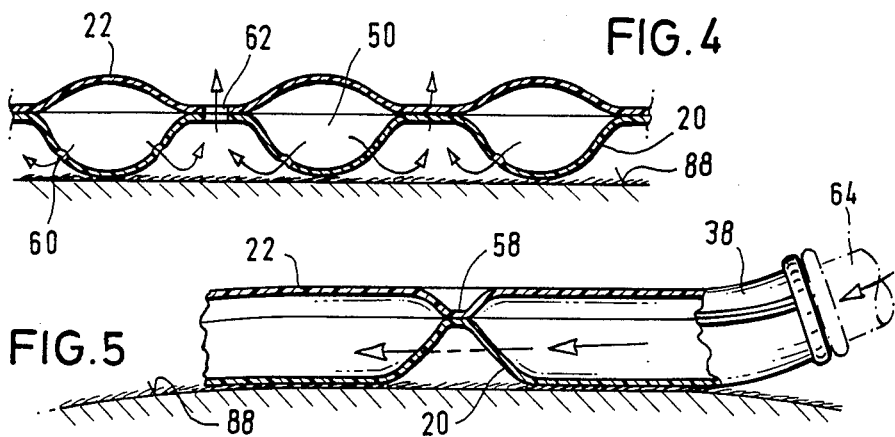
FIG. 4
FIG. 5

FIG.6
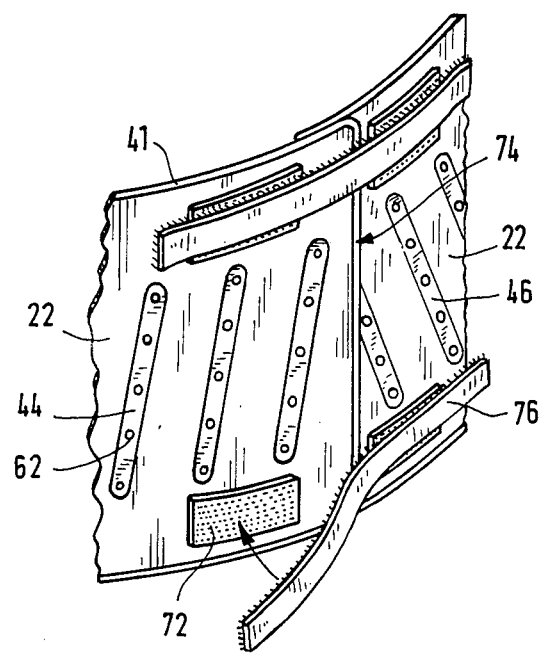
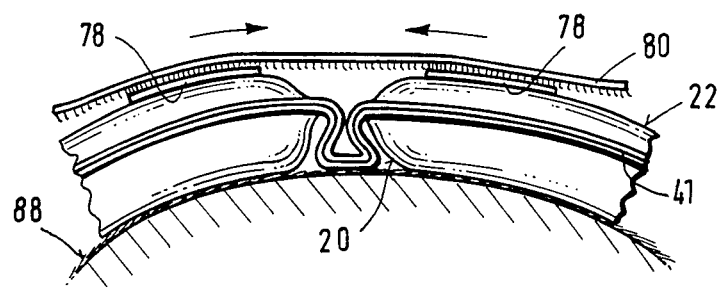
FIG.7

DRYING APPARATUS FOR HORSES AND THE LIKE

BACKGROUND OF THE INVENTION

This invention relates to a drying apparatus for horses and the like and is intended especially for horses.

Horses, when wet, may catch a cold or even more serious deseases like pyelitis if the ambient temperature is low or if there is a considerable draft. Horses may get a wet coat uner several reasons: Horses are known to transpire. If a horse has been exhausted or worked hard, e.g. if a horse has been ridden on a military course or a high-jump competition, the coat is usually damp and may be thouroughly wet. Furtheron horses need to be washed from time to time, then the coat gets wet, too. Finally, a horse may get wet in the rain.

DESCRIPTION OF PRIOR ART

Wet horses are usually rubbed with a towel until they are more or less dry and covered with a horse-blanket afterwards. Drying horses in such a way is tedious, fatiging and time-consuming. It takes some time until all parts of a coat are reached and under severe ambient conditions it may happen, that the horse nevertheless gets a cold.

Furtheron horses can be dryed by using known portable dryers, e.g. hair dryers. Drying a horse in such a way is tedious, too, and takes some time. As the warm drying air is only applied locally, the horse may feel uncomfortable or even catch a cold.

Under lower ambient temperatures or under draft horses should only be dryed in a shelter and preferably in a closed room. Such a shelter is not always available at sporting competitions or during a country ride, for example.

Starting with these facts in mind, the invention has the objectives of providing an apparatus for drying horses, which feeds warm air to all parts of a body of a horse at the same time and operates more or less automatically.

The further objective of the invention is to provide a drying apparatus which shelters a horse against draft or wet ambient conditions.

A further objective of the invention is to provide for a drying apparatus for horses which can be adapted to different sizes of horses easily.

A further objective of the invention is to provide for a drying apparatus for horses which fits to the horse, does not fall off if the horse moves and does not need a human help or hand to hold it or apply it when the drying is performed.

A further objective of the invention is to provide for a drying apparatus for horses which when applied allows for a certain freedom of movement of the horse.

A further objective of the invention is to provide for a drying apparatus for horses which is extremely light in weight and comfortable to wear.

SUMMARY OF THE INVENTION

These and further objectives of the invention are met by a drying apparatus, which has the following characteristics: an inflatable jacket made of an inner cut and an outer cut. Both cuts are made from an airtight flexible foil and have identical shape. The cuts are bonded together along their margins except at at least one supply region, and are further bonded together at different sets of connecting stripes. Tubelike air ducts are formed between adjacent connecting stripes. The inner cut has a plurality of discharge holes, so that air from the air ducts can escape through the discharge holes and flow towards the inside of the jacket, where the body of the horse is. Vent holes are provided in the area of the connecting stripes. Closure means are provided at the outer cut for closing and opening said jacket. The jacket when feeding warm air through the said supply region is inflated and assumes the shape of a tubelike body, the warm air flows through the discharge holes into the inner side of the jacket and escapes through the ventholes to the outside of the jacket.

The jacket when closed forms a loop which does not fall off even if the horse moves and cannot be slipped off or shaken off by a horse. A helping hand is needed only for applying and removing the jacket, during the drying period the horse may be left alone and may move within a confined area. The jacket on the other hand shelters the horse against draft or wetness, because no air can reach the body of a horse from outside when covered with the jacket.

The warm air necessary for drying is delivered by a conventional hot air blower which is separate from the jacket and from the horse, so that the horse does not need to carry the weight of the blower. The blower may rest on a floor or can be fixed to any support, like a wall. A flexible air tube connects the blower to the jacket. The jacket itself may have a rather low weight, it is constructed of thin, flexible plastic sheeting and typically has a weight, which is lower than the weight of a horse-blanket. During the drying the weight of the jacket is further reduced, because the warm air streams escaping through the discharge holes tend to lift the jacket and form an air cushion between the body of the horse and the jacket.

The jacket may be easily adapted to different sizes of horses by adjusting the closure members or even by turning up the portion of the jacket in the region of the backbone, so that a sort of reefing is reached.

It is preferred to have a jacket with three openings. The first opening is for a neck, the second opening is for the two front legs and a third opening is for the two rear legs and the tail of the horse. Such a jacket envelops the body of the horse and only head and neck, the four legs and the tail remain uncovered. The jacket fits a horse like a dress and will not get out of place even if the horse moves. It cannot slip around the body like a simple, tubular jacket with only two openings may do, and it covers all critical areas of the body to a greater extent than a simple tubelike jacket would do.

Further advantages and characteristics of the invention are derived from the following description of the preferred embodiment of the invention.

THE DRAWING

A preferred embodiment of the invention is illustrated in the attached drawing in which:

FIG. 1 is a perspective view of the drying apparatus attached to a horse;

FIG. 2 a top view onto the displaid drying apparatus of FIG. 1;

FIG. 3 an enlarged view of the encircled detail III in FIG. 2;

FIG. 4 a sectional plan view along line IV—IV in FIG. 3;

FIG. 5 a sectional plan view along line V—V in FIG. 3;

FIG. 6 a perspective view of the detail VI shown in FIG. 1, and

FIG. 7 a rear view as shown by arrow VII in FIG. 1.

DETAILED DESCRIPTION OF THE ILLUSTRATED EMBODIMENT

The drying apparatus as shown in the Figures is especially destined for horses, but may be employed if properly adapted and sized, for dogs, ponies and the like. The apparatus mainly consists of two sheetings or plies, namely an inner cut 20 and an outer cut 22, both made of a thin plastic foil which is flexible, airtight, heat resistant up to approx. 120 degree Celsius, does not rot, and is anti-bacterial. A material like polyethylene is preferred. The inner cut is 0.13 millimeter thick, the outer cut is 0.2 millimeter thick. The two cuts 20, 22 may be made from a single, continuous sheeting, each, or from several smaller cuts, which are properly connected to form one of the said two cuts 20, 22.

Figure 2:
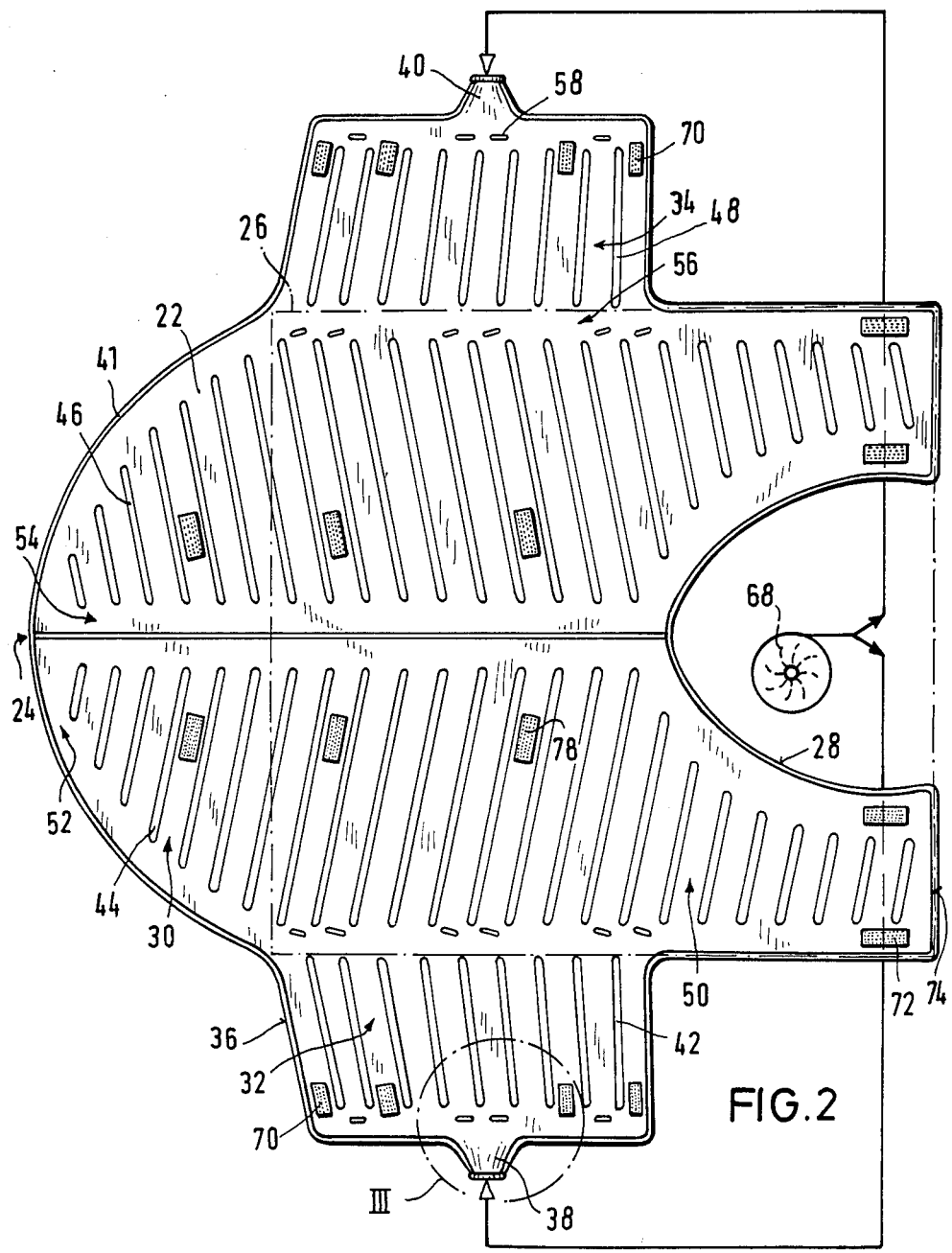

Both cuts 20, 22 have identical shape, the shape is shown in FIG. 2, and is symmetrical to a line 24 shown in FIG. 2. This shape is generally defined by a rectangle 26 shown by a dashed-dotted line 26 in FIG. 2, which has an almost semicircular exemption 28 for a neck, the diameter of this exemption 28 is about one half of the adjacent, shorter side of the rectangle 26. An almost semicircular protrusion 30 is attached to the other smaller side of the rectangle 26, this protrusion 30 extends over the entire length of this other (left) smaller side. Furtheron two identical belly-regions 32, 34 extend over the said rectangle 26 and are attached to the longer sides of said rectangle 26, each. They are almost rectangular, too, and extend with their longer side over about one half of the length of the longer side of the rectangle 26. One of their shorter sides 36 is almost continuous with the outer margin of the protrusion 30.

The two cuts 20, 22 are bonded together along their entire margins except at two supply regions 38, 40, the bond 41 is obtained by welding, adhesive bonding may be applied as well. Further on the two cuts 20, 22 are bonded together along the line 24 and at four different sets of connecting stripes 42, 44, 46, 48. The connecting stripes 42-48 of each set run parallel. The stripes are one centimeter wide. The stripes 42, 48 of the belly-regions are 35 centimeter long, the stripes 44, 46 of the main regions are up to 60 centimeter long. Their mutual distance is about 8 centimeter. Tubelike airducts 50 are formed between adjacent connecting stripes 42-48. As the connecting stripes 42-48 end about 8 centimeter inside from the outer margin of the two cuts 20, 22 a further marginal air duct is formed beween the marginal bond 41 and the stripes 42-48. Furtheron an air duct 54 is formed between the line 24, where the two cuts 20, 22 are bonded, and the neighbouring ends of the connecting stripes 44, 46, which are eight centimeter apart from said line 24. Finally air ducts 56 are formed between the two different sets of stripes 42, 44 and 46, 48, resp., of each half of the drying apparatus. All ducts 50–56 of each half of the drying apparatus communicate and can be filled by supplying air into the corresponding supply region 38 or 40. The connecting stripes 42-48 run almost parallel to the shorter side of the said rectangle 26. The stripes 44, 46 run V-like and include an angle of approximately 22 degree. The air ducts 50 of the belly-regions 32, 34 run in an angle of 18 degree to the air ducts 50 of a main portion of the drying apparatus and continue said air ducts 50.

The entries of some of the air ducts 50 (as seen in the direction of inflowing air) is partially obstructed by barriers 58, which are formed by bonding the two cuts 20, 22 over a length of 3.5 centimeter. These barriers 58 are arranged in such a way that the access to those air ducts 50, which are in the direction of inflowing air, is rendered more difficult and a more or less regular filling of all air ducts 50 is reached.

As can be seen from FIG. 3 the inner cut 20 has perforations in form of discharge holes 60, which are arranged only between connecting stripes 42-48, i.e. only in air ducts 50, and are not present in other air ducts 52-56. The discharge holes 60 have a diameter of 1.5 millimeter, approximately, one hole is provided for every two centimeter of an air duct 50.

Furtheron vent-holes 62 are provided in the connecting stripes 42-48. They have a diameter of four millimeters, are arranged on a line, and have a mutual distance of four centimeters.

Figure 1:
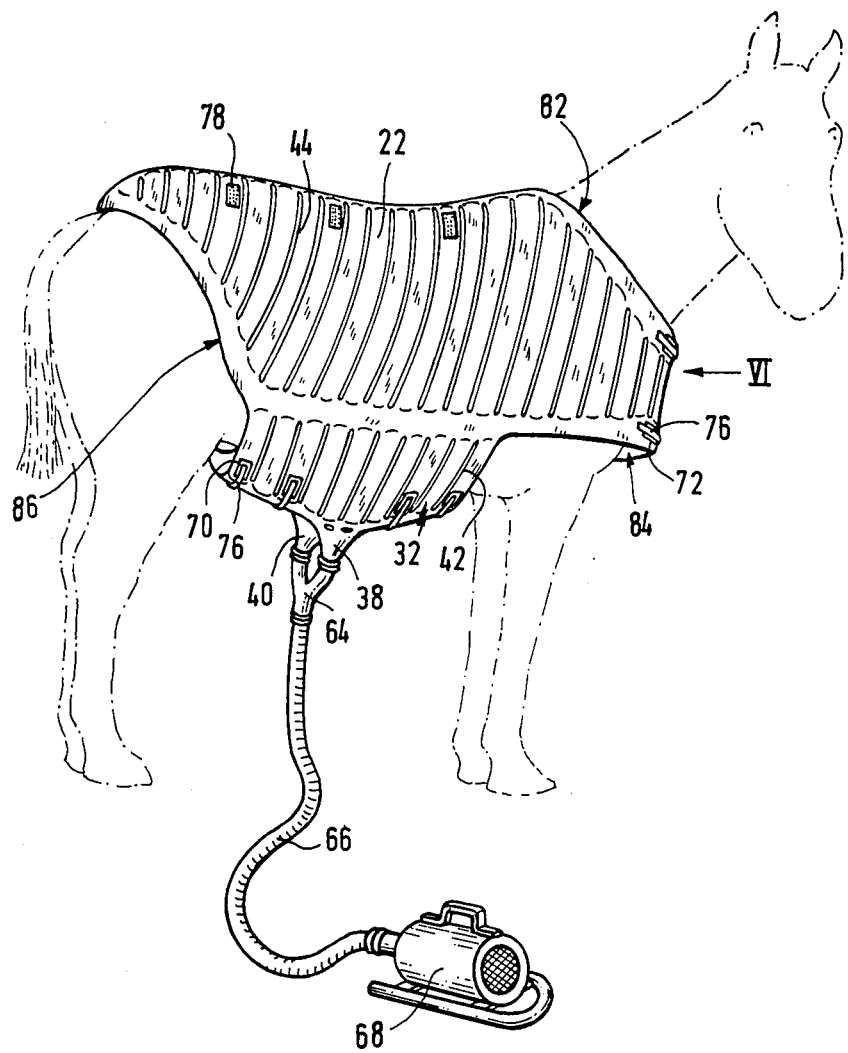

The supply regions 38, 40 are arranged at approximately mid-length of the outer and longer side of the belly-regions 32, 34, resp. Here the cuts form small protrusions and end in an annular inlet, at their frontmost part the two cuts are fixed to or overlap an elastic annular means like a rubber ring. This ring can be forced over a tubular inlet piece 64 of Y-shape, as shown in FIG. 1. This inlet piece 64 can be attached to a flexible air tube 66, through which air is supplied to the inlet piece 64 and fed to the two inner spaces defined by the two cuts 20, 22, i.e. the two identical halves of the drying apparatus. The air tube 66 is 3.3 meters long and attached to a blower 68 delivering warm air into the said air tube 66. The blower 68 is conventional, so is the air tube 66, there is no need to describe both parts 66, 68 in detail.

The drying apparatus has closure means to close the two-dimensional shape shown in FIG. 2 into a tubelike body or jacket as shown in FIG. 1. For this four closure pads 70 each are arranged close to the longer and outer side of each belly-region 32, 34 and identical closure pads 72 are arranged near the two sections 74 of the smaller side of the rectangle 26 adjacent to the entry of the exemption 28. These closure pads 70, 72 cooperate with closure strips 76 shown in FIGS. 1, 6 or 7. The closure pads 70, 72 and the closure strips 76 form a secure, but releasable connection. In the example shown, see FIGS. 6 and 7, both have a bur-like surface, these surfaces cooperate and form a frictional bond. In use each closure strip 76 which bridges the distance between two corresponding closure pads 70 or 72 of two end sections to be fixed together, remains attached to one of the said two pads 70 or 72, and is only fixed to or released from the other pad 70 or 72, as shown in FIG. 6, bottom. Hence the strips 76 cannot be lost, though they can be easily replaced.

The pads 70, 72 are arranged in a certain distance to the connecting stripes 42-48 and on the outer surface of the outer cut 22 in the middle of ducts 50, 52.

Finally two sets of three pads 78 like the pads 70, 72 are provided in a distance of approximately twelve centimeters from the line 24 of symmetry. They are not intended for closing the jacket formed by the cuts 20, 22, but to shorten the length of the smaller sides of the rectangle 26. As shown in FIG. 7 the material between two adjacent and cooperating pads 78 can be folded and reefed, a strip 80 like the closure strips 76 connects adjacent pads 78 and holds the configuration shown in place. The force exerted to bring together the two portions neighbouring line 24 and the forces in the strip 80 are shown by arrows in FIG. 7.

When applying the blanket-like structure shown in FIG. 2 to a horse, the structure is laid onto a horse, whereby the line 24 follows the back bone of the horse. The jacket is formed by closing a first loop around the belly of the horse, which is done by attaching the corresponding closure strips 76 to the closure pads of one belly-region 32 or 36. A second loop encircling the neck of the horse is formed by closing the respective two closure means provided near the sections 74. This second loop is in the region of the exemption 28. When closing the jacket in the way described the length of each loop can be adjusted by varying the length of the strips 76 between the pads 70. Hence the drying apparatus can be adjusted to horses of different size. In FIG. 6, where the closing of the neck-loop of the drying apparatus is shown, the two sections 74 overlap. Such an overlap is not always necessary and there may be a certain distance between the two sections 74 or the margins of the belly-regions 32, 34.

The jacket formed by the closed drying apparatus has a first opening 82 for the neck of the horse, a second opening 84 for the two front legs and a third opening 86 for the rear legs and the tail.

The jacket formed by closing the four closing strips 76 of the belly-regions 34, 36 and the two closing members of the sections 74 can now be inflatet by blowing air through the supply regions, as shown in FIG. 5. The instreaming air uniformly fills all air ducts 50–56 and the apparatus assumes a corrugated outer (and inner) shape. The air escapes through the discharge holes 60 towards the inside of the jacket. There the air comes in contact with a coat 88 of a horse, takes up moisture and escapes through the vent-holes 62, as shown by arrows in FIG. 4.

After filling and inflating the air ducts 50–56 the closure members may be rearranged and fixed in such a way, that a small space appears between the inner cut 20 and the coat 88 of the horse. Due to the air escaping through the discharge holes 60 and directed more or less obliquely towards the coat 88, the drying apparatus is forced and moved away from the coat 88 and an air cushion is formed between the apparatus and the coat 88.

As can be seen from FIG. 1 the size of the drying apparatus is adapted to the size of a normal horse. The length of the longer sides of the belly-regions is somewhat shorter than the distance between the two pair of legs of a horse. The length of the line 24 is approximately the length from the tail towards the neck of a horse, i.e. and equals the length of the backbone except the neck-portion. The total length of the margin of the exemption 28 is adapted to the perimeter of the neck.

When not inflated the drying apparatus is extremely flat and may be folded into a small-sized packet. To avoid sticking of the inner faces of the two pads 20, 22, an adequate separating agent or means is applied to the inner space defined by the two cuts 20, 22.

The supply regions 38, 40 forming connection pieces to the inlet piece 64 are made from a flexible material which is more resistant to wear and use than the relatively thin material of the two cuts 20, 22.

I claim:

1. Drying apparatus for horses and the like, comprising in combination an inflatable tubelike jacket made of an inner cut and an outer cut, wherein both cuts (a) are made from an airtight flexible foil, (b) have identical shape, (c) are bonded together along their margins at marginal bonds except at two supply regions, (d) are bonded together at different sets of connecting stripes, which terminate in a distance of some centimeters inside of the outer margin whereby tubelike air ducts are formed between adjacent connecting stripes, and marginal air ducts are formed between the marginal bonds and the adjacent connecting stripes, (e) the two cuts are further bonded along a back-bone line and (f) are symmetrical to said line; the inner cut has a plurality of discharge holes arranged only in the tubelike air ducts, and vent-holes are provided in the area of the connecting stripes, and closure means are provided at the outer cut for closing and opening said tubelike jacket, wherein the jacket when feeding air through the said supply regions and into the air ducts is inflated and assumes the shape of a tubelike body having three openings, a first opening for a neck, a second opening for frontlegs and a third opening for rear legs and a tail of the horse, the air flowing through the discharge holes into the inner side of the jacket escapes through the vent-holes to the outside of the jacket.

2. Drying apparatus as set forth in claim 1 further comprising a warm air blower and a flexible arm tube for connecting said blower to the said supply region.

3. Drying apparatus as set forth in claim 1, wherein the shape of the two cuts is defined by a rectangle exhibiting at one of its shorter sides an exemption for a neck of a horse, and at the other smaller side a protrusion, and further exhibiting approximately rectangular belly regions attached to the longer sides of the rectangle.

4. Drying apparatus as set forth in claim 1, wherein closure pads cooperating with closure strips and forming with said closure strips the closure means are arranged on the outer cut near the margin of said cut.

5. Drying apparatus as set forth in claim 3, wherein pads are arranged on both sides of said back-bone line of symmetry, said pads cooperting with strips, which can releasably be fixed to said pads and the material between two pads can be reefed, so that a perimeter of the jacket can be adjusted.

6. Drying apparatus as set forth in claim 1, wherein each half of the drying apparatus exhibits two different sets of connecting stripes, namely a set of stripes for a belly region and a set of stripes for a main region, and air ducts are formed between the two different sets of stripes.

7. Drying apparatus as set forth in claim 6, wherein the air ducts of the belly regions have entries (as seen in the direction of inflowing air) and some entries are partially obstructed by barriers, whereby these barriers are arranged in such a way that the access to those air ducts which are in the direction of inflowing air is rendered more difficult and a more or less regular filling of all ducts of the belly region is reached.

8. Drying apparatus as set forth in claim 6, wherein the belly region exhibit an outer and longer side and the supply regions are arranged at approximately mid-length of this side.

* * * * *